US008995380B2

United States Patent
Choi et al.

(10) Patent No.: US 8,995,380 B2
(45) Date of Patent: Mar. 31, 2015

(54) SCHEDULING IN A MULTI-HOP WIRELESS NETWORK

(71) Applicant: Texas Instruments Incorporated, Dallas, TX (US)

(72) Inventors: Soon-Hyeok Choi, Allen, TX (US); Ariton E. Xhafa, Plano, TX (US); Yanjun Sun, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 188 days.

(21) Appl. No.: 13/849,015

(22) Filed: Mar. 22, 2013

(65) Prior Publication Data

US 2013/0250928 A1  Sep. 26, 2013

Related U.S. Application Data

(60) Provisional application No. 61/614,270, filed on Mar. 22, 2012.

(51) Int. Cl.
  *H04W 4/00* (2009.01)
  *H04W 72/04* (2009.01)

(52) U.S. Cl.
  CPC ............................ *H04W 72/0446* (2013.01)

USPC .................................................. 370/329

(58) Field of Classification Search
  None
  See application file for complete search history.

(56) References Cited

U.S. PATENT DOCUMENTS

| 7,813,373 | B2 * | 10/2010 | Joshi et al. | 370/458 |
| 8,767,705 | B2 * | 7/2014 | Goppner et al. | 370/350 |
| 2005/0169313 | A1 * | 8/2005 | Okamura et al. | 370/477 |
| 2007/0110102 | A1 * | 5/2007 | Yagyuu et al. | 370/470 |
| 2007/0140149 | A1 * | 6/2007 | Gandham et al. | 370/255 |
| 2008/0112387 | A1 * | 5/2008 | Gandham et al. | 370/345 |
| 2011/0149799 | A1 * | 6/2011 | Wu et al. | 370/254 |
| 2011/0206062 | A1 * | 8/2011 | Mitsunobu et al. | 370/458 |
| 2013/0083722 | A1 * | 4/2013 | Bhargava et al. | 370/315 |

\* cited by examiner

*Primary Examiner* — Anh-Vu Ly
(74) *Attorney, Agent, or Firm* — Steven A. Shaw; Frank D. Cimino

(57) ABSTRACT

Various techniques are disclosed for assigning timeslots in a multihop wireless network. One such method includes, for each node for uplink timeslot assignments, assigning a higher hop count node to a timeslot that is to occur before all time slots assigned to lower hop count nodes. The method further includes, for each node for downlink timeslot assignments, assigning a lower hop count node to a timeslot that is to occur before all time slots assigned to higher hop count nodes.

16 Claims, 3 Drawing Sheets

SCHEDULING IN A MULTI-HOP WIRELESS NETWORK

CROSS-REFERENCE TO RELATED APPLICATION

This application claims priority to U.S. Provisional Application Ser. No. 61/614,270 filed Mar. 22, 2012, and incorporated herein by reference.

BACKGROUND

Radio power consumption dominates power consumption in battery-operated wireless sensor network device. Thus, to ensure a long life of a wireless sensor network, sensor devices should communicate with each other while minimizing the use of their transceivers (radios). Most sensor network devices minimize the radio power consumption by, in the Media Access Control (MAC) layer, duty-cycling of radio listening. In duty-cycled radio listening, the radio is periodically wakened for a short time interval to receive packets, rather than the radio being left on continuously listening for transmissions targeting that device. Such duty cycling of the radios in a battery-operated sensor network greatly reduces the power consumption.

However, a problem of such low power duty-cycled MAC protocols is the latency in delivering packets. Since a receiver node periodically turns on its radio for short time durations to receive packets, a transmitter node may desire to postpone its transmission to the next wake-up time of the receiver, which can cause the delay of transmissions to increase by the wake-up period of the receivers. This problem becomes worse when duty-cycled MAC protocols are deployed in multihop wireless sensor networks. Since every intermediate node in the multihop delivery path needs to wait and then forward, in the worst case, delivering packet from a leaf source node to the sink node can be delayed by n-times the wake up period of duty-cycled MAC for each hop, where "n" is the number of hops.

Time Division Multiple Access (TDMA)-based duty cycling is one of the periodic listening techniques used in low power sensor network MAC protocols. In TDMA-based low power MAC protocols such as TSCH [IEEE 802.15.4e Low rate Wireless Personal Area Networks. Amendment 5: Amendment to the MAC sublayer. 2011] and wireless HART, a set of timeslots comprises a superframe. Specific timeslots in the superframe are assigned for the devices to allow them to exchange packets. The devices turn on their radios only at the assigned timeslot for packet transmission and reception.

Thus the duty-cycled TDMA network can control the timeslot of each node in multihop wireless sensor network to meet the requirements of multihop networks such as duty-cycle and latency. To minimize the latency of multihop wireless sensor network while maintaining the low active duration of network, a set of algorithms have been proposed in literature such as Green-wave algorithm [S. Guha, C.-K. Chau, and P. Basu, "Green wave: Latency and capacity efficient sleep scheduling for wireless networks," in Proc. IEEE INFOCOM, March 2010], in which timeslots are assigned such that the wakeup timeslot of a node happens just before the wakeup timeslot of next hop in the multihop delivery path. However, some of the existing algorithms require a lot of detailed information on multihop network topology such as hop count of a node, neighbors of each node and a series of nodes in each multihop delivery path, which is not desirable for resource limited sensor network devices.

SUMMARY

The various embodiments disclosed herein are directed to a method of assigning timeslots in a multihop wireless network. The method includes, for each node for uplink timeslot assignments, assigning a higher hop count node to a timeslot that is to occur before all time slots assigned to lower hop count nodes. The method further includes, for each node for downlink timeslot assignments, assigning a lower hop count node to a timeslot that is to occur before all time slots assigned to higher hop count nodes.

BRIEF DESCRIPTION OF THE DRAWINGS

For a detailed description of exemplary embodiments of the invention, reference will now be made to the accompanying drawings in which.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Existing algorithm addresses the latency problem of duty-cycled TDMA in general purpose multihop wireless mesh network. The disclosed algorithm provides a mechanism for simple scheduling mechanism that can improve latency of duty-cycled TDMA based wireless sensor network in which traffic pattern can be mainly classified into beacon, uplink and downlink and in which devices are resource limited.

To address the latency of multihop wireless sensor network problem while reducing the complexity and thus reducing the resource requirement, we propose a simple but effective TDMA timeslot scheduling algorithm. The proposed method schedules the timeslots of a node by only considering the hop count of each node. Further it considers the fact that traffic in wireless sensor network is composed of mostly uplink packets which is delivered from a node to the root gateway node, and downlink packets which is delivered from the root gateway to the node.

Although the examples given are IEEE802.15.4e TSCH (Time Synchronized Channel Hopping) [IEEE 802.15.4e Low rate Wireless Personal Area Networks. Amendment 5: Amendment to the MAC sublayer. 2011.] MAC protocol which is one of duty-cycled TDMA MAC protocols, the proposed mechanism could apply to other duty-cycled TDMA MAC protocols.

Figure 1:
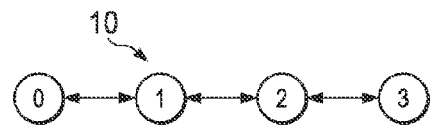
FIG. 1 shows a multihop network in accordance with principles of the disclosure.

FIG. 1 illustrates a multihop network 10 comprising wireless nodes 0, 1, 2, and 3, although any number of nodes are possible. The arrows interconnecting pairs of nodes illustrate that only the interconnected nodes can communicate with one another. For example, node 0 can send packets to and receive packets from node 1, but not nodes 2 and 3. Node 2 can exchange packets with nodes 1 and 3, but not node 0. If node 3 needs to send a packet to node 0, node 3 must send the packet to node 2, and node 2 will forward the packet to node 1, which in turn will forward the packet to node 0. A pair of nodes that are within wireless range of each other and can exchange packets (e.g., nodes 0 and 1) may be referred to herein as "adjacent" nodes.

One of the nodes (e.g., node 0) is designated as the personal area network (PAN) coordinator. The PAN coordinator is in charge of the entire network 10 and defines a superframe. A superframe comprises multiple (e.g., 120) equal length timeslots. Some timeslots may be designated to be uplink time slots, while other time slots may be designated to be downlink time slots. Further still, other timeslots in the superframe may be used to communicate beacons which provide synchronization as well as configuration information for the network.

Figure 2:
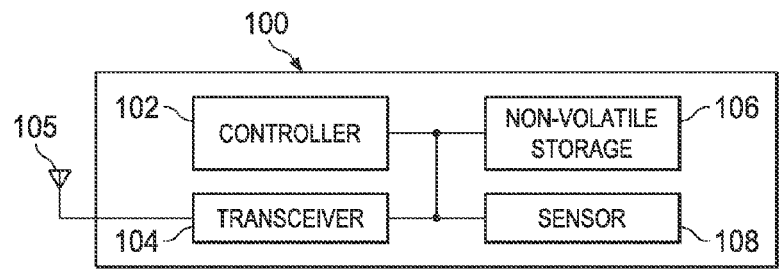
FIG. 2 shows a block diagram of a wireless node in accordance with principles of the disclosure.

FIG. 2 illustrates a block diagram of any or all of the nodes in the multihop network 10, such as the node that functions as the PAN coordinator. The illustrative node 100 in FIG. 2 includes a controller 102, a transceiver 104, non-volatile storage 106, and a sensor 108. Different architectures are possible as well. In some implementations, the multihop network 10 is a wireless sensor network and thus each node includes sensor 108. For example, as a wireless sensor network, the various nodes may monitor environmental conditions such as temperature, humidity, pressure, etc. Such a sensor network may be useful in a variety of applications such as monitoring the environmental conditions in a large data center containing numerous computing devices (e.g., servers, storage devices, etc.) that generate heat. Environmental conditions detected by the various sensors may be useful as feedback information to the data center's heating, ventilation and air-conditioning (HVAC) system.

The controller 102 may be implemented as a processor that executes code stored in the non-volatile storage 106. The non-volatile storage 106 represents any suitable type of non-transitory, computer-readable storage device. The transceiver sends and receives information (e.g., packets) from other nodes in the network via an antenna 105.

A superframe comprises a plurality of timeslots in which certain nodes are permitted to transmit packets to adjacent nodes in the network. The PAN controller determines which nodes are permitted to transmit packets in the various timeslots of the superframe. In some implementations, the superframe comprises three types of timeslots—uplink timeslots, downlink timeslots, and beacon timeslots (although different or additional timeslot types are possible as well such as shared timeslots). In an uplink timeslot, a node delivers or forwards a packet to the next hop node toward the root node in the network. If node 0 in FIG. 1 is the root node (e.g., the PAN controller), then in an uplink timeslot, node 3 may transmit a packet to node 2, node 2 may transmit a packet to node 1, and node 1 may transmit a packet to node 0.

In a downlink timeslot, packets are transmitted in the opposite direction than in the uplink timeslots. As such, in downlink timeslot, a node delivers or forwards a packet to the next hop node toward the leaf node in the network. If node 0 in FIG. 1 is the root node (e.g., the PAN controller), then, node 4 is the leaf node (i.e., the node at the opposite end from the root node). As such, in a downlink timeslot, node 0 may transmit a packet to node 1, node 1 may transmit a packet to node 2, and node 2 may transmit a packet to node 3.

In a beacon timeslot, a node originates and/or forwards a beacon packet to an adjacent node. In general, the beacon timeslots are in the downlink direction.

Figure 3:
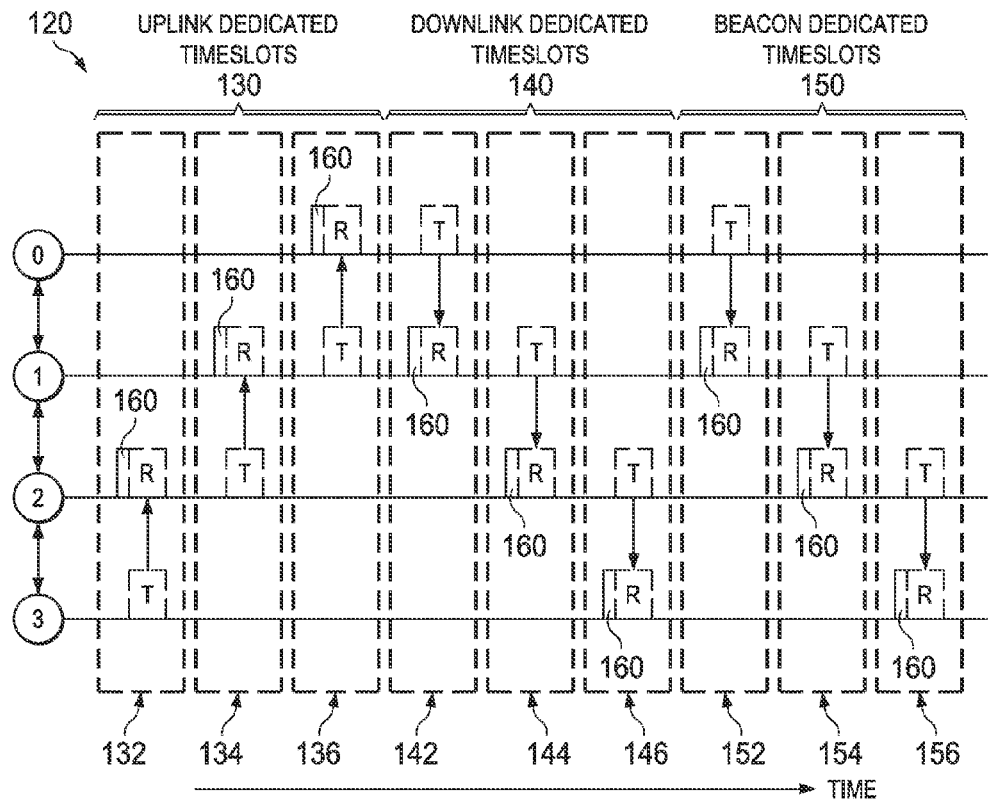
FIG. 3 illustrates the scheduling of timeslots in accordance with principles of the disclosure.

FIG. 3 illustrates a superframe as comprising a plurality of timeslots 130, 140, and 150. The superframe may contain, for example, 16 timeslots although only 9 timeslots are shown. Timeslots 130 include uplink timeslots, while timeslots 140 and 150 include downlink and beacon timeslots, respectively. Packets being transmitted are designated with a "T" while the received packets are designated with an "R." Thus in the leftmost uplink timeslot 132, node 3 transmits a packet to node 2, while in the next uplink timeslot 134 (next in time), node 2 transmits a packet to node 1. In the following uplink timeslot 136, node 1 transmits a packet to node 0.

For the downlink timeslots 140, which comprise timeslots 142, 144, and 146, node 0 transmits a packet to node in the first downlink timeslot 142, while nodes 1 and 2 transmit packets to nodes 2 and 3, respectively, in the following timeslots 144 and 146 as shown. Beacon packets are transmitted in a similar fashion among beacon timeslots 152, 154, and 156.

The various uplink, downlink and beacon timeslots preferably are scheduled by the PAN coordinator as illustrated in FIG. 3 to minimize latency in the network. The PAN coordinator is presumed to know the hop-count of each node with respect to the PAN coordinator at the time that the timeslots are scheduled. The hop-count of each node with respect to the PAN coordinator represents the number of hops a packet experiences from a given node to the PAN coordinator. For example, node 3 has a hop-count of 3 with respect to the PAN coordinator node 0, while node 1 has a hop-count of 1.

In some embodiments, the timeslot assignments are made according to the following rules:

Uplink timeslot assignment: A node with a higher hop-count needs to send a packet to the next hop node that has a lower hop-count. Timeslot of a higher hop-count node happens earlier than that of a lower hop-count node.

Downlink timeslot assignment: A node with a lower hop-count needs to send a packet to the next hop node that has a higher hop-count. Timeslot of a lower hop-count node happens earlier than that of a higher hop-count node.

Referring still to FIG. 3, implementing the above uplink timeslot assignment rule results in time staggering assignment of the uplink timeslots from highest hop-count node (node 3) to lowest hop-count node (node 1). That is, node 3 transmits to node 2 in one timeslot 132, while node 2 then transmits a packet (or forwards the packet received from node 3) to node 1 in the next timeslot 134. Similarly, node 1 then transmits a packet (or forwards the packet received from node 2) to node 0 in the next timeslot 136. Reference numerals 160 identify when the transceiver 104 of each node preferably is turned on before receiving the packet. Thus, node 2 turns on its transceiver 140 in timeslot 132 as shown and keeps it on through the next timeslot 134 to transmit a packet to node 1. Each node's transceiver 104 is advantageously turned on generally only for two consecutive timeslots.

Another advantage of the timeslot scheduling depicted in FIG. 3 is that a packet being transmitted from leaf node 3 to root node 0 is transmitted from the source node to the destination node with minimal latency.

A similar scheduling process is implemented for the downlink timeslots in FIG. 3. Implementing the above downlink timeslot assignment rule results in time staggering assignment of the uplink timeslots from lowest hop-count node (node 0) to highest hop-count node (node 2). That is, node 0 transmits to node 1 in one timeslot 142, while node 1 then transmits a packet (or forwards the packet received from node 0) to node 2 in the next timeslot 144. Similarly, node 2 then transmits a packet (or forwards the packet received from node 1) to node 3 in the next timeslot 146. The scheduling of the beacon timeslots 152-156 is similar to the downlink timeslots 142-146.

The timeslot scheduling protocol of FIG. 3 is satisfactory as long as there are a sufficient number of timeslots in a superframe relative to the number of nodes of varying hop-counts. In the example of FIG. 3, the 3 uplink timeslots 132-136 are sufficient to accommodate the four nodes 0-3. The scheduling paradigm of FIG. 3 is satisfactory as long as the number of nodes at the various hop-count levels equals the number of timeslots in each category (e.g., uplink, downlink, and beacon) plus 1.

Figure 4:
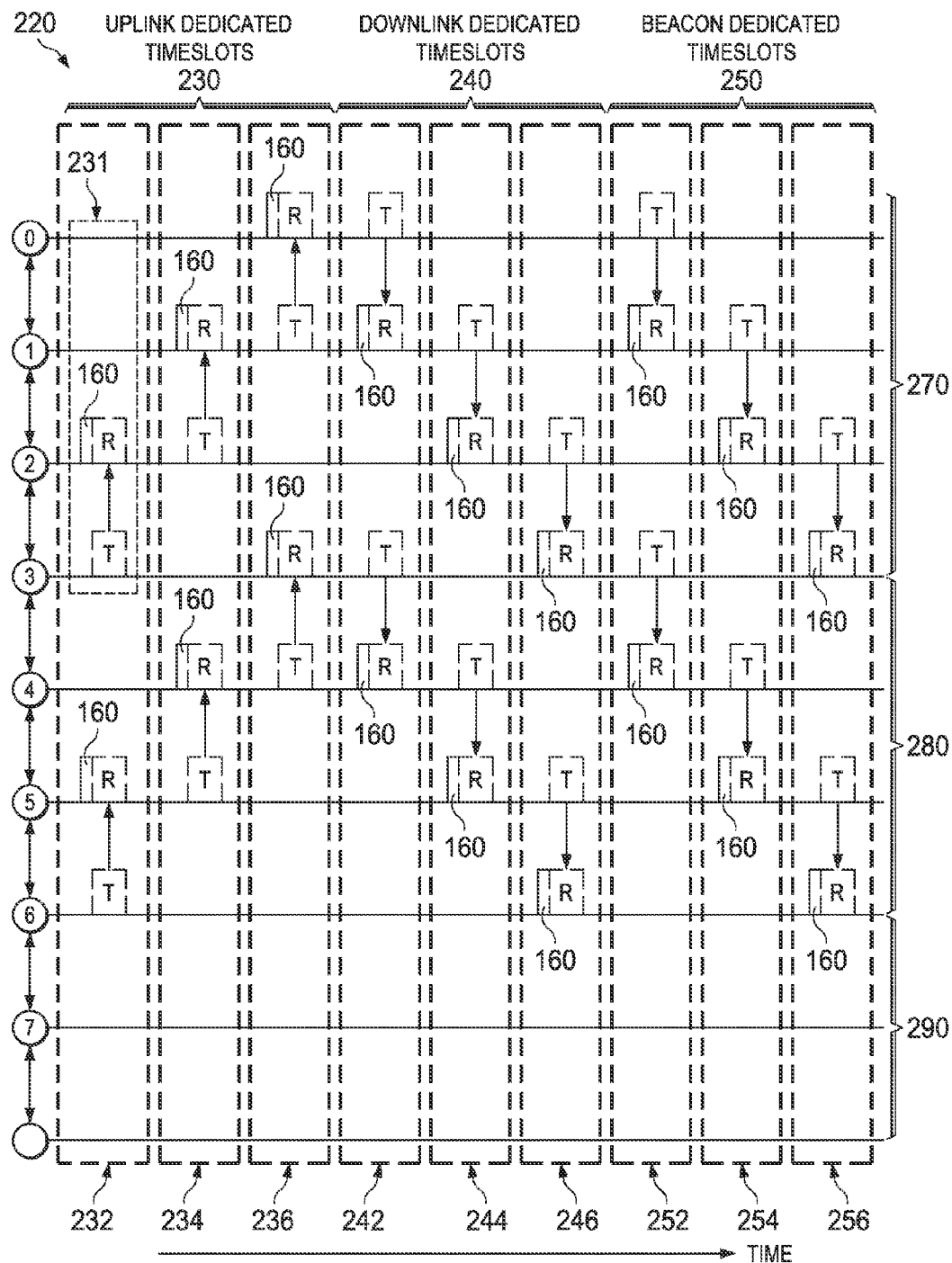
FIG. 4 illustrates the scheduling of timeslots among multiple scheduling blocks in accordance with principles of the disclosure.

Other network implementations, however, may not have a sufficient number of available timeslots relative to the number of nodes of varying hop-counts. For example, if the network includes 8 nodes), then 3 uplink timeslots is an insufficient number of timeslots to permit the staggering as shown in FIG. 3. FIG. 4 illustrates an embodiment which permits the efficient scheduling of timeslots in a network containing more than 1 plus the number of nodes at the various hop-count levels. With 3 timeslots in each category, the scheduling embodiment of FIG. 4 is preferable in a network containing more than 4 timeslots (3 timeslots per category+1). FIG. 4 illustrates how 8 eight nodes (nodes 0-7) can be scheduled in accordance with the preferred embodiments of the invention.

The embodiment of FIG. 4 introduces the "scheduling block" denoted by reference numerals 270, 280, and 290. Each scheduling block maintains the timeslots for nodes within a certain range of hop-counts. In the example of FIG. 4, scheduling block 270 is responsible for scheduling the timeslots of nodes 0-3 (i.e., nodes within 3 hops of the root node 0). Scheduling block 280 is responsible for scheduling the timeslots for nodes 3-6 (i.e., nodes that are 3-6 hops of the root node). Scheduling block 290 is for all other nodes (i.e., nodes more than 6 hops from the root node). Any number of scheduling blocks is possible and any number of nodes associated with each scheduling block is possible as well. The embodiment of FIG. 3 pertains to a single scheduling block (e.g., one scheduling block that includes all nodes in the multihop wireless network), whereas the embodiment of FIG. 4 pertains to multiple scheduling blocks.

Each scheduling block comprises multiple "scheduling units." Each scheduling unit is an independent scheduling entity which maintains each type of timeslot for nodes at a certain hop count. In the example of FIG. 4, scheduling unit 231, for example, in scheduling block 270 maintains the uplink timeslots for nodes within 3 hops of the root node 0.

Within each scheduling unit of each scheduling block 270-290, the various timeslots are assigned in a similar staggered fashion as described above with respect to FIG. 3. For example, node 3 in scheduling block 270 is scheduled for uplink timeslot 232 while adjacent node 2 is scheduled for the next uplink timeslot 234 as shown. Node 6 in scheduling block 280 similarly is scheduled for uplink timeslot 232 while adjacent node 5 is scheduled for the uplink timeslot 234. As such, nodes 3 and 6 are scheduled for uplink transmissions in the same timeslot (timeslot 232). Scheduling two or more nodes to transmit in the same timeslot is acceptable as long as the nodes are sufficiently far from each other so as to avoid excessive interference. The spacing between nodes that are permitted to transmit in the same timeslot is taken into account when a person configuring the network sets the hop-range for a given scheduling block. Thus, independent scheduling of the timeslots of each scheduling block is possible.

The proposed mechanism allows the duty-cycled TDMA MAC protocols to balance the latency requirement and power consumption of wireless sensor network. In addition, the proposed mechanism is based on simple mechanism in which hop count of node is used without sophisticated knowledge about multihop network topology, which is suitable for resource limited wireless sensor network devices.

The timeslot scheduling techniques described herein balance latency concerns and power consumption of wireless devices in a multihop network. The scheduling techniques preferably take into account only the hop count of the nodes (i.e., the number of hops between that node and the root node).

Figure 5:
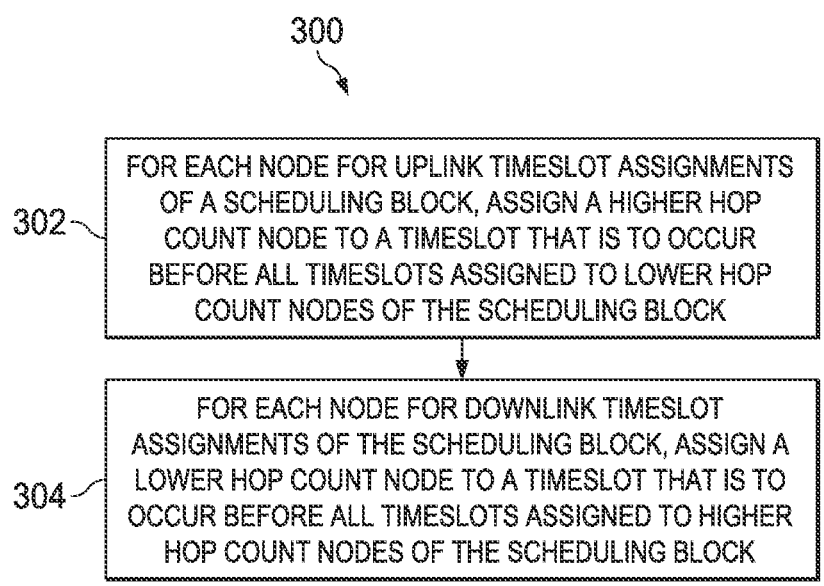
FIG. 5 provides a method of assigning timeslots in accordance with principles of the disclosure

FIG. 5 illustrates a method 300 in accordance with principles of the disclosure. As shown, the method includes at 302, for each node for uplink timeslot assignments of a scheduling block, assigning a higher hop count node to a timeslot that is to occur before all time slots assigned to lower hop count nodes of the scheduling block. At 304, the method also includes for each node for downlink timeslot assignments of the scheduling block, assigning a lower hop count node to a timeslot that is to occur before all time slots assigned to higher hop count nodes of the scheduling block.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of assigning timeslots in a multihop wireless network, comprising:
    for each node for uplink timeslot assignments of a scheduling block, assigning a higher hop count node to a timeslot that is to occur before all time slots assigned to lower hop count nodes of the scheduling block; and
    for each node for downlink timeslot assignments of the scheduling block, assigning a lower hop count node to a timeslot that is to occur before all time slots assigned to higher hop count nodes of the scheduling block.

2. The method of claim 1 further comprising enabling a transceiver of each node in network during a timeslot assigned to that node to receive a packet from an adjacent node and maintaining the transceiver enabled through a subsequent timeslot and then disabling the transceiver.

3. The method of claim 1 wherein the scheduling block includes all nodes in the multihop wireless network.

4. The method of claim 1 further comprising for each of a plurality of scheduling blocks for uplink timeslot assignments, assigning a higher hop count node to a timeslot that is to occur before all time slots assigned to lower hop count nodes, and for each of the plurality of scheduling blocks for downlink timeslot assignments, assigning a lower hop count node to a timeslot that is to occur before all time slots assigned to higher hop count nodes.

5. The method of claim 4 wherein among at least two of the plurality of scheduling blocks, the method comprises assigning a plurality of nodes to a same uplink or downlink timeslot.

6. A wireless coordinator, comprising:
    a wireless transceiver; and
    a controller coupled to the wireless transceiver to cause wireless timeslot assignment information to be transmitted by the wireless transceiver in a multihop network;

wherein the controller, for each node for uplink timeslot assignments of a scheduling block, assigns a higher hop count node to a timeslot that is to occur before all time slots assigned to lower hop count nodes of the scheduling block; and wherein the controller, for each node for downlink timeslot assignments of the scheduling block, assigns a lower hop count node to a timeslot that is to occur before all time slots assigned to higher hop count nodes of the scheduling block.

7. The wireless coordinator of claim 6 wherein the controller enables the transceiver during a timeslot assigned to that node to receive a packet from an adjacent node and maintains the transceiver enabled through a subsequent timeslot and then disables the transceiver.

8. The wireless coordinator of claim 6 wherein the scheduling block includes all nodes in the multihop wireless network.

9. The wireless coordinator of claim 6 wherein for each of a plurality of scheduling blocks for uplink timeslot assignments, the controller assigns a higher hop count node to a timeslot that is to occur before all time slots assigned to lower hop count nodes, and for each of the plurality of scheduling blocks for downlink timeslot assignments, the controller assigns a lower hop count node to a timeslot that is to occur before all time slots assigned to higher hop count nodes.

10. The wireless coordinator of claim 9 wherein among at least two of the plurality of scheduling blocks, the controller assigns a plurality of nodes to a same uplink or downlink timeslot.

11. A method of assigning timeslots to a plurality of wireless nodes configured to operate in a multihop network, comprising:

dividing the plurality of wireless nodes into a plurality of scheduling blocks, each scheduling block comprising a plurality of wireless nodes;

for each node for uplink timeslot assignments and within each scheduling block, assigning a higher hop count node to a timeslot that is to occur before all time slots assigned to lower hop count nodes of the scheduling block; and for each node for downlink timeslot assignments and within each scheduling block, assigning a lower hop count node to a timeslot that is to occur before all time slots assigned to higher hop count nodes of the scheduling block.

12. The method of claim 11 wherein assigning the higher hop count nodes to timeslots comprises assigning nodes of different scheduling blocks to a same timeslot.

13. The method of claim 11 wherein assigning the lower hop count nodes to timeslots comprises assigning nodes of different scheduling blocks to a same timeslot.

14. A wireless coordinator, comprising:

a wireless transceiver; and a controller coupled to the wireless transceiver to cause wireless timeslot assignment information to be transmitted by the wireless transceiver in a multihop network;

wherein the controller, for each node for uplink timeslot assignments of each of a plurality of scheduling blocks, assigns a higher hop count node to a timeslot that is to occur before all time slots assigned to lower hop count nodes of the scheduling block; and wherein the controller, for each node for downlink timeslot assignments of each of the plurality of scheduling blocks, assigns a lower hop count node to a timeslot that is to occur before all time slots assigned to higher hop count nodes of the scheduling block.

15. The wireless coordinator of claim 14 wherein the controller assigns the higher hop count nodes to timeslots comprises by assigning nodes of different scheduling blocks to a same timeslot.

16. The wireless coordinator of claim 14 wherein the controller assigns the lower hop count nodes to timeslots comprises by assigning nodes of different scheduling blocks to a same timeslot.

* * * * *